United States Patent
Feisst et al.

(10) Patent No.: US 7,999,725 B2
(45) Date of Patent: Aug. 16, 2011

(54) LEVEL MONITORING DEVICE FOR DETERMINING AND MONITORING A FILL LEVEL OF A MEDIUM IN THE PROCESS AREA OF A VESSEL

(75) Inventors: Klaus Feisst, Stegen (DE); Eric Bergmann, Steinen (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 62 days.

(21) Appl. No.: 12/448,410

(22) PCT Filed: Dec. 6, 2007

(86) PCT No.: PCT/EP2007/063464
§ 371 (c)(1),
(2), (4) Date: Nov. 12, 2009

(87) PCT Pub. No.: WO2008/077738
PCT Pub. Date: Jul. 3, 2008

(65) Prior Publication Data
US 2010/0141505 A1 Jun. 10, 2010

(30) Foreign Application Priority Data
Dec. 22, 2006 (DE) .......................... 10 2006 062 223

(51) Int. Cl.
*G01S 13/08* (2006.01)
(52) U.S. Cl. ...... 342/124; 342/175; 73/290 V; 73/290 R
(58) Field of Classification Search .................. 342/124, 342/175; 73/290 V, 290 R, 866.5; 343/703, 343/878, 893; 114/343; 174/27, 28, 142
See application file for complete search history.

(56) References Cited

U.S. PATENT DOCUMENTS

| | | | |
|---|---|---|---|
| 4,352,949 A * | 10/1982 | Cookson | 174/27 |
| 7,255,002 B2 * | 8/2007 | Gravel et al. | 73/290 V |
| 7,586,450 B2 * | 9/2009 | Muller | 343/703 |
| 7,640,799 B2 * | 1/2010 | Griessbaum et al. | 73/290 V |
| 2002/0135508 A1 * | 9/2002 | Kleman | 342/124 |
| 2004/0173020 A1 | 9/2004 | Edvardsson | |
| 2005/0253751 A1 * | 11/2005 | Feisst et al. | 342/124 |
| 2006/0000274 A1 * | 1/2006 | Kallsand et al. | 73/290 V |
| 2007/0028829 A1 * | 2/2007 | Griessbaum et al. | 114/343 |
| 2007/0109178 A1 * | 5/2007 | Schultheiss | 342/124 |
| 2008/0003872 A1 * | 1/2008 | Chen et al. | 439/578 |
| 2008/0272968 A1 * | 11/2008 | Muller | 343/703 |
| 2009/0212996 A1 * | 8/2009 | Chen et al. | 342/124 |
| 2010/0090883 A1 * | 4/2010 | Chen et al. | 342/124 |
| 2010/0141505 A1 * | 6/2010 | Bergmann et al. | 342/124 |

FOREIGN PATENT DOCUMENTS

| | | | |
|---|---|---|---|
| DE | 100 60 068 C1 | | 6/2002 |
| DE | 102007061571 | * | 7/2009 |
| EP | 1 396 710 A2 | | 3/2004 |
| JP | 2003 310 554 A | | 11/2003 |

* cited by examiner

*Primary Examiner* — John B Sotomayor
(74) *Attorney, Agent, or Firm* — Bacon & Thomas, PLLC

(57) ABSTRACT

A fill level measuring device for ascertaining and monitoring fill level of a medium in the process space of a container by means of a microwave travel time measuring method. The device includes: measurement transmitter; and an antenna unit, which is constructed at least of a hollow conductor and a radiating element, wherein a process isolation element is inserted into the hollow conductor for process isolation between measurement transmitter and the process contacting, radiating element. The process isolation element is made of a ceramic material and includes at least one glass layer, via which the process isolation element is directly glass bonded in the hollow conductor in a glass bonding region.

14 Claims, 2 Drawing Sheets

LEVEL MONITORING DEVICE FOR DETERMINING AND MONITORING A FILL LEVEL OF A MEDIUM IN THE PROCESS AREA OF A VESSEL

CROSS-REFERENCE TO RELATED APPLICATIONS:

This application is the U.S. National Stage of PCT/EP2007/063464, which was filed on Dec. 6, 2007, which claims priority of German application DE 10 2006 062 223.5, which was filed on Dec. 22, 2006.

TECHNICAL FIELD

The present invention relates to a fill level measuring device for ascertaining and monitoring fill level of a medium in the process space of a container.

BACKGROUND DISCUSSION

One measuring method, out of a number of measuring methods for ascertaining fill level in a container, is the travel time measuring method. With this measuring method, for example, microwaves are radiated via an antenna device and the waves reflected from the surface of the medium are detected, with the travel time of the measuring signal being a measure of distance. From half the travel time, the fill level of the medium in a container can, in this way, be ascertained. The echo curve represents, here, the entire curve of the signal as a function of time, with each measured value of the echo curve corresponding to an amplitude of an echo signal reflected at a surface at a certain distance. The travel time measuring method is essentially divided into two evaluation methods: in the time difference measurement method, the time, which a broadband wave, signal pulse requires for a traveled distance, is determined, and in the frequency modulated, continuous wave method (FMCW—Frequency Modulated Continuous Wave), the transmitted, frequency-modulated, high frequency signal is compared with the reflected, received, frequency-modulated, high frequency signal. In the following, no restriction is made to any particular method of measurement.

In the case of certain process applications, fill level measuring devices are exposed to extreme conditions, for example high temperatures, high pressures and/or chemically aggressive substances. In particular, microwave, fill level measuring devices contain temperature, and/or pressure, sensitive components. These include, for example, measuring device electronics and transmission and/or reception elements for the microwaves.

Insertion of a hermetically sealed, process isolation element into the hollow conductor of the antenna ensures highest possible safety, since a second "safety element" seals the process, during an isolating of the modular, measurement active parts, such as e.g. a coupling element/exciter element or the measuring device electronics, from the measurement passive parts, such as e.g. the antenna, for maintenance or repair.

This problematic and a solution therefor are considered in European Patent EP 0 943 902 A1. There, a fill level measuring device working with microwaves is described for high temperature applications. The device has an antenna and includes a process isolation element in the hollow conductor region of the antenna. A glass window, among others, is described as a process isolation element. These glass windows protect the sensitive components of the fill level measuring devices against extreme measurement conditions, such as high temperatures, high pressures, and chemically aggressive media. A disadvantage of this design of the process isolation element is that the glass window must, because of the available production technology, for example due to the different material expansions, be provided in a thin-walled metal sleeve. This sleeve with the glass window must be soldered or welded in further, complicated, working steps into the hollow conductor. This requires a high additional work effort associated with the production of the antenna of the fill level measuring device. In addition, with the many working steps, manufacturing costs and safety risk are increased due to manufacturing errors.

Published U.S. application, US 2005/0253751 A1, describes a modular construction of a horn antenna. The process isolation element is constructed in the form of a ceramic, matching cone that is introduced into the hollow conductor and sealed by graphite packing rings. This design has the disadvantage that sealing against gas diffusion and a temperature resistant, process isolation are not achieved.

In German patent, DE 199 50 429 A1, a ceramic process isolation element is described that is shrunk fit into the hollow conductor. Disadvantageous, here, is that, despite polished bounding surfaces on the process isolation element and in the waveguide, no seal is achieved. Further, the large compressive forces that act on the ceramic, process isolation element can lead to stress cracks.

A disadvantage of the aforementioned examples of embodiments of a state of the art process isolation element is that manufacture is very complex and expensive. In order to obtain a connection impervious to gas diffusion between a ceramic and a surrounding metal, hollow conductor, only a soldering procedure is well-known according to the state of the art. In such case, the ceramic, as process the isolation element, is first metallized on the surface in complex working steps, then soldered into a soldering sleeve, which has a coefficient of thermal expansion similar to that of the ceramic (e.g. Kovar), and this finally is welded into a stainless steel, hollow conductor. Other joining techniques, such as, for example, shrink fitting at high temperature, always have a certain leakage rate and are not impervious to gas diffusion, as already mentioned.

SUMMARY OF THE INVENTION

An object of the invention is to provide a fill level measuring device having a gas diffusion resistant, process isolation element for process isolation, which does not exhibit the disadvantages specified above, and which, in particular, can be produced economically and simply.

This object of the invention is achieved by a process isolation element which comprises a ceramic material and at least one glass layer, via which the process isolating layer is bonded in a glass bonding region directly to the hollow conductor.

Advantageous further developments of the invention are specified in the dependent claims.

BRIEF DESCRIPTION OF THE DRAWINGS

Further details, characteristics, and advantages of the subject matter of the invention will be understood from the following description in combination with the associated drawings, in which advantageous embodiments of the invention are presented. In the embodiments of the invention presented in the figures of the drawing, in order not to clutter and for simplification, components or groups of components, which correspond in their structure and/or in their function, are given similar reference characters. The figures of the drawing show as follows.

DETAILED DISCUSSION IN CONJUNCTION WITH THE DRAWINGS

Figure 1:
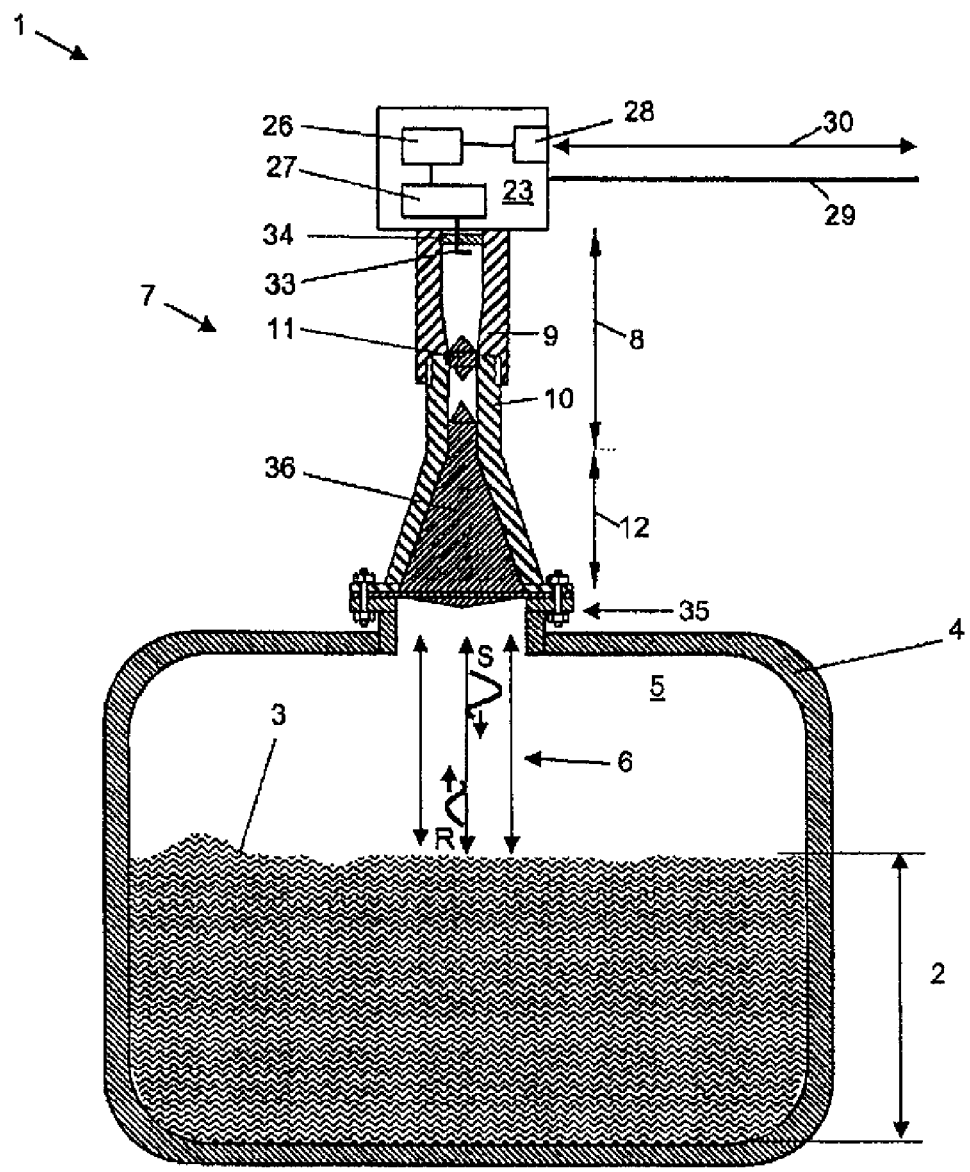
FIG. 1 a schematic representation of an antenna unit equipped, fill level measuring device of process measurements technology.

FIG. 1 shows a fill level measuring device 1 of process measurements technology used for determining the fill level 2 in a container 4. The fill level measuring device is composed, fundamentally, of an antenna unit 7 and a measurement transmitter 23. The antenna unit 7 includes in a hollow conductor 8, in this example of an embodiment, a process isolation element 11 of the invention. The fill level measuring device 1, which is mounted via a process connection 35 onto the container 4, ascertains, for example by the travel time measurement method, the level 2 of a medium 3 and/or fill substance in the container 4. The antenna unit 7 is, in this example embodiment, provided in the form of a horn antenna. The process isolation element 11 of the invention is also deployable with other types of antenna units, such as, for example, rod antennas, planar antennas, parabolic antennas, and in measuring systems of time domain reflectometry working with a waveguide-led microwave. The antenna unit 7 can be divided into two fundamental, functional units—the hollow conductor 8 and the radiating element 12.

Provided in the measurement transmitter 23 is a transmitting/receiving unit 27, in which the microwave measuring signals 6 are produced. Via a coupling element 33, the microwave measuring signals 6 are coupled into the hollow conductor 8 of the antenna unit 7. The coupling element 33 is installed in the hollow conductor 8 via a gas diffusion blocking, glass feedthrough. The microwave measurement signals 6 coupled into the hollow conductor 8 of the antenna unit 7 are radiated, in given cases, through a filling element 36, from the radiation element 10, as sent, or transmission, signals S into the process space 5 with a predetermined radiation characteristic. Usually the aim is to have a radiation characteristic of the microwave measuring signals exhibiting a planar wave front, in order to avoid travel time differences in the reflection signals R. The microwave measuring signals 6 transmitted into the measurement space 5 are reflected from the surface of the medium 3 and received, after a certain travel time, back at the transmitting/receiving unit 27. From the travel time of the microwave measurement signal 6, the fill level 2 of the medium 3 in the container 4 is determined.

The control/evaluation unit 26 in the measurement transmitter 23 has the task of evaluating the received reflection signals R of the microwave measuring signals 6, using further processing of the measurement signal 6 by signal processing and special, signal evaluating algorithms, as an echo curve, and therefrom, the travel time, or the fill level 2, is ascertained.

The control/evaluation unit 26 communicates via a communication interface 28 with a remote control location and/or with additional fill-level measuring devices 1, which are not explicitly shown. Via the supply line 29, the fill-level measuring device 1 can be supplied with the required energy. This additional supply line 29 for energy supply of the fill-level measuring device 1 is absent, when the device is a so called two-conductor measuring device, whose communication and energy supply take place via the fieldbus 30 exclusively and simultaneously via a two-wire line. The data transmission, or communication, via the fieldbus 30 occurs, for example, according to the CAN, HART, PROFIBUS DP, PROFIBUS FMS, PROFIBUS PA, or FOUNDATION FIELDBUS standard.

Figure 2:
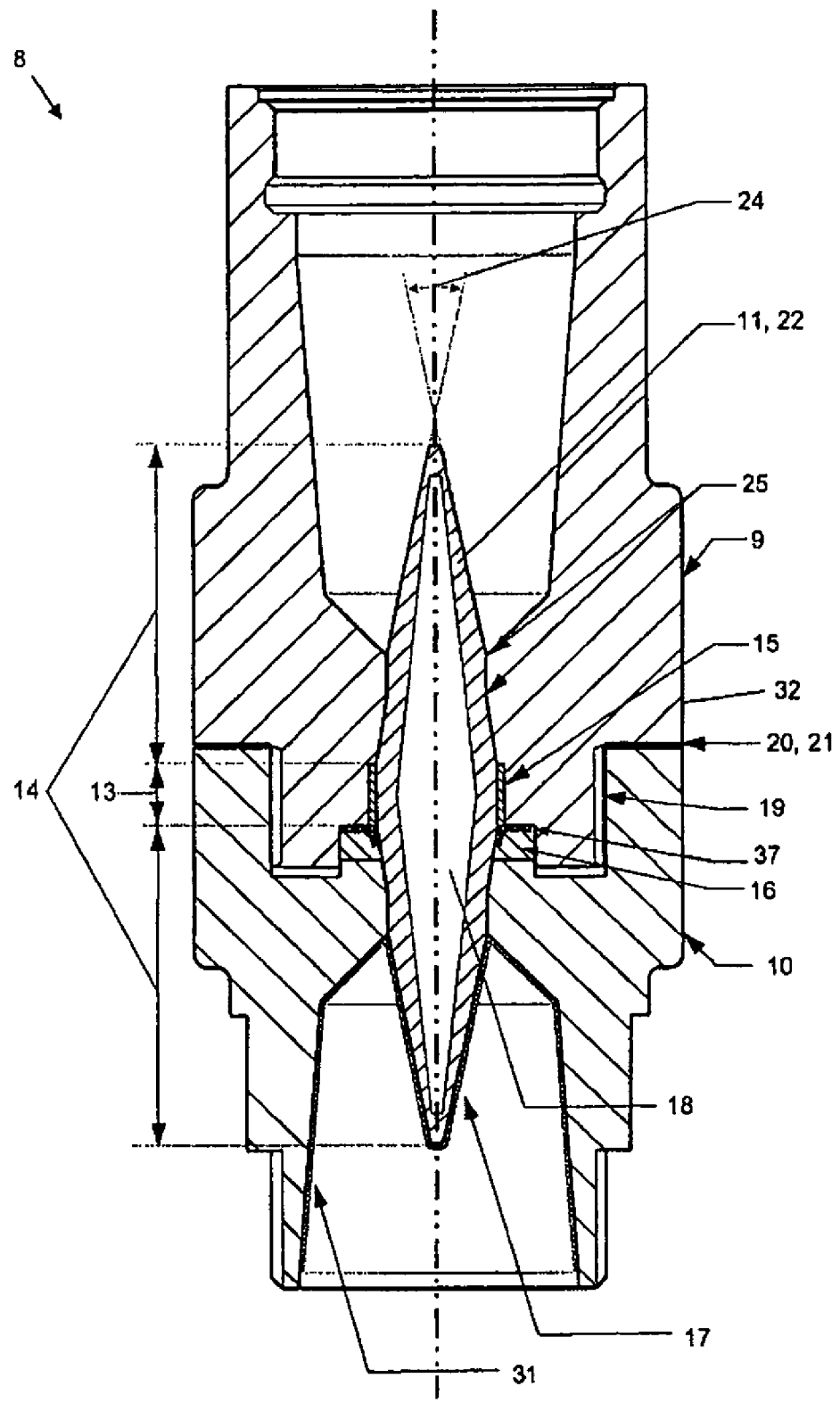
FIG. 2 a longitudinal, sectional view of the hollow conductor of the antenna unit of FIG. 1, having a process isolation element according to the invention.

FIG. 2 presents a sectional view of an example of an embodiment of the hollow conductor 8 with the glass bonded, ceramic, process isolating element 11 of the invention. According to the invention, a ceramic matching cone 22 transmissive for microwaves is provided, which is melt bonded in a metal, hollow conductor 8 by means of a 1-2 mm thick, annular glass layer 15. The hollow conductor 8 is, in this case, embodied in the form of a round, hollow conductor. However, any other form of hollow conductor 8 can be used for the installation of the invention of the matching cone 22 by means of glass bonding. Through glass bonding of the ceramic matching cone 22 in the hollow conductor 8, there is achieved a gas diffusion blocking, microwave transmissive, process isolation, which is well suited for use in the face of high temperatures, high pressures and aggressive process conditions. Disadvantageous with a glass layer 15 contacting the process, however, is that glass is corroded by steam. In order to avoid this corrosion of the thin glass layer 15, a graphite packing ring 16 is placed in front of the glass layer 15 for protecting it. The sealing action of the graphite packing ring 16 is achieved by executing the hollow conductor 8 in two parts and, by a screwed connecting of the two elements 9,10 of the hollow conductor 8, a compressive force is exerted on the graphite packing ring 16. Additionally, a corrosion resistant coating 37 can be applied partially on the glass layer 15. This corrosion resistant coating 37 can be produced, for example, through vapor deposition of a chromium/gold coating. A graphite packing ring 16 as corrosion protection of the glass layer 15 is, due to the corrosion protection from the application of a corrosion resistant coating 37, then no longer absolutely necessary. However, the graphite packing ring 16 then provides an additional sealing action.

Through introduction of the process isolating element 11 into the hollow conductor 8, the wave resistance of the conductor system is altered. In order to match this wave resistance, the hollow conductor is tapered, especially in the matching region 14. The process isolating element 11 includes an matching cone 22 having a cylindrical shape, which tapers in the matching region 14 toward both end faces at a certain angle 24, and which has, thus, on both sides at least one step or multistep, conical appendages. The embodiment of the process isolating element 11 as matching cone 22 has, as a result, that the maximum diameter of the cone is larger than the minimum diameter of the hollow conductor 8 at the position of maximum necking. For this reason, it can be necessary to make the hollow conductor 8 in two parts at the location of the glass bonding, or introduction, and to provide there a location of separation 20.

In this example of an embodiment, the hollow conductor 8 is, such as already mentioned, constructed of two units, a first element 9 and a second element 10, which are connected with one another via a screwed connection 19. At the location of separation 21, the first element 9 and the second element 10 are welded together gas tightly via a radially surrounding, weld seam on the outer surface 32, or at the location of separation 20. This two part construction of the hollow conductor 8 is necessary in this example of an embodiment, since, first of all, the process isolating element 11 is embodied as matching cone 22 for matching the wave resistance, and, secondly, because, for protection of the glass layer against steam, an additional graphite packing ring is placed in front of it as a supplemental sealing element.

For lessening the attenuation of the microwaves 6, for example, a hollow space 18 is provided in the process isolating element 11 and filled with a dielectric, fill material 38. This fill material 38 has, relative to the ceramic of the matching cone 22, a much smaller permittivity, or dielectric constant, whereby the intensity of the microwaves 6 is not strongly attenuated by the fill material 38. Furthermore, selected as fill material 38 is, for example, a material having a small thermal expansion, e.g. ROHACELL, a material comprising hollow glass spheres or additional, temperature compensated fillers.

The matching cone 22 is, according to the invention, inserted in the first element 9 of the hollow conductor 8. In such case, a glass substrate is introduced either as powder or prefabricated ring into a free gap in the glass bonding region 13 and melted by a predetermined temperature cycle in a furnace. Used as glass substrate are, for example, glasses usual for glass feedthroughs. In the melted state, the glass layer 15 brings about with the metal, hollow conductor 8 and/or the ceramic matching cone 22 a material bonded interlocking, gas diffusion blocking connection. Furthermore, another option is to apply a glass layer 15 directly on the ceramic body of the matching cone 22 and to use this prefabricated part in the seat provided therefor in the first element 9 of the hollow conductor 8. The application of a thin glass layer 15 of some millimeters can occur, for example, also using a chemical or physical gas phase deposit coating method (CVD, PVD). The heating of the glass layer 15 can, for example, also be achieved by radiating highly energetic microwaves with a high intensity focused on the glass layer 15, so that a strong heating is produced only zonally in the glass bonding region 13. Once the matching cone 22 is bonded via the glass layer 15 in the first element 9 of the hollow conductor 8 and, in given cases, a corrosion resistant coating 37 applied, then the graphite packing ring 16 is pressed via the screwed connection 19 of the second element 10 of the hollow conductor 8 fixedly into the cavity provided below the glass layer 15. Advantageously, the expansion coefficients of the materials of the matching cone 22, the hollow conductor 8 and the glass layer 15 are so matched to one another, that no extreme stresses, or even stress cracks, occur in the material composite. The matching cone 22 is, for example, made of a technical-grade, aluminum oxide ceramic.

For increasing the quality of sealing and the corrosion resistance, the ceramic matching cone 22 bonded by the glass in the hollow conductor 8, and the inner surfaces 31 of the hollow conductor 8 can even be provided with an additional coating 17. This coating can be produced, for example, by a simple chemical or physical gas phase deposit, coating method (CVD, PVD).

A further advantage of the glass bonding in comparison to soldering is that no complicated surface preparation, such as polishing, or hardening, or curing, of the ceramic and no expensive materials, such as e.g. Kovar for the soldering sleeve, are required. Moreover, the manufacture of the process isolating element 11 and its glass bonding in the hollow conductor 8 are clearly easier and therewith significantly more cost effective.

The process isolating element 11 of the invention delivers other advantages, for instance, that the coupling element 33 in the case of condensate formation, and/or the electronics and the coupling element 33, can be removed, since in a first safety stage, the measurement-inactive parts of the antenna unit 7, such as, for example, the flange-plating of the filling element 36 seal the process to the outside and the process isolating element 11 forms a second safety stage (second line of defense). In this way, an option is provided, in the case of an alteration or repair of the fill-level measuring device 1, to mount the measurement transmitter 23 on the antenna unit 7, with the process being in a sealed state. Depending on embodiment and application, the fill-level measuring device 1 can be composed of different modules. An alteration of the fill-level measuring device 1 to use another type of coupling, e.g. step, or pin, coupling, or another frequency, e.g. 6 GHz or 26 GHz, is possible through the isolation of the active parts from the passive parts with the process being in a sealed state. The coupling element 33 is, for example, modularly embodied and can be inserted via a screwed connection into the hollow conductor 8.

The invention claimed is:

1. A fill-level measuring device for ascertaining and monitoring fill level of a medium located in a process space of a container by means of a method measuring travel time of microwaves, said device comprising:
    a measurement transmitter;
    an antenna unit, which is constructed at least of a hollow conductor and a radiating element;
    and a process isolating element transmissive for microwaves is inserted in said hollow conductor, between said measurement transmitter and said radiating element contacting the process, for process isolation, wherein:
    said process isolating element comprises a ceramic material and at least one glass layer, via which said process isolating element is bonded in a glass bonding region directly to said hollow conductor.

2. The apparatus as claimed in claim 1, further comprising:
    at least one graphite packing ring on the process side, which has an additional sealing action and protects said at least one glass layer of the direct glass bonding on the process-side against corrosion from the medium.

3. The apparatus as claimed in claim 1, wherein:
    at least one partially applied, corrosion resistant coating is provided on the process-side on said glass layer, which protects said glass layer of the direct glass bonding on the process-side against corrosion from the medium.

4. The apparatus as claimed in claim 2, wherein:
    said hollow conductor is constructed of a plurality of parts, including at least a first element and a second element.

5. The apparatus as claimed in claim 4, wherein:
    securement by means of a screwed connection of said first element and said second element is provided, which effects an additional sealing action due to compression exerted on said graphite packing ring.

6. The apparatus as claimed in claim 1, wherein:
    a surrounding weld seam is provided on the outer surface of said hollow conductor, which secures a location of separation of said first element and said second element of said hollow conductor against rotation.

7. The apparatus as claimed in claim 1, wherein:
said at least one glass layer has a thickness of 0.5 to 5 millimeters.

8. The apparatus as claimed in claim 1, wherein:
on the process-side, a microwave transmissive, corrosion resistant coating is provided on said glass-bonded, process isolating element and/or the inner surface of said hollow conductor.

9. The apparatus as claimed in claim 1, wherein:
said ceramic, process isolating element is embodied as an matching cone, whose cross section in a matching region conically tapers starting from a glass bonding region of the zonal, direct glass bonding of the matching cone in said hollow conductor, in at least one step and at at least one angle.

10. The apparatus as claimed in claim 1, wherein:
a hermetically sealed, hollow space is provided in the interior of said ceramic, process isolating element.

11. The apparatus as claimed in claim 10, wherein:
a microwave transmissive fill material with a smaller permittivity is provided in the hermetically sealed, hollow space of said ceramic, process isolating element.

12. The apparatus as claimed in claim 1, wherein:
a single step or multistep, linearly decreasing inner diameter of said hollow conductor is provided in a matching region of said process isolating element in the direction of the zonal, direct glass bonding.

13. The apparatus as claimed in claim 1, wherein:
provided as material for said hollow conductor is a stainless steel tube or a ceramic, or plastic, tube coated with metal on inner surfaces.

14. The apparatus as claimed in claim 1, wherein:
a planar antenna, a parabolic antenna, a horn antenna or a rod antenna is provided as said antenna unit.

* * * * *